United States Patent
Semsey

(10) Patent No.: US 6,176,555 B1
(45) Date of Patent: Jan. 23, 2001

(54) METHOD AND DEVICE FOR CONTROLLING HANDLING DYNAMICS OF MOTOR VEHICLES

(75) Inventor: Akos Semsey, Budapest (HU)

(73) Assignee: Knorr-Bremse Systeme fuer Nutzfahrzeuge GmbH, Munich (DE)

( * ) Notice: Under 35 U.S.C. 154(b), the term of this patent shall be extended for 0 days.

(21) Appl. No.: 09/117,386

(22) PCT Filed: Nov. 19, 1996

(86) PCT No.: PCT/DE96/02199

§ 371 Date: Jul. 29, 1998

§ 102(e) Date: Jul. 29, 1998

(87) PCT Pub. No.: WO97/28017

PCT Pub. Date: Aug. 7, 1997

(30) Foreign Application Priority Data

Jan. 29, 1996 (DE) .............................. 196 02 879

(51) Int. Cl.[7] .................................................. B60T 13/00
(52) U.S. Cl. .............................. 303/7; 303/140; 303/146; 280/282
(58) Field of Search .................................... 303/140, 146, 303/139, 7, 191, 192, 199; 180/282, 283, 284, 285

(56) References Cited

U.S. PATENT DOCUMENTS

| 4,976,330 | | 12/1990 | Matsumoto . | |
|---|---|---|---|---|
| 5,134,352 | * | 7/1992 | Matsumoto et al. | 303/146 |
| 5,683,152 | * | 11/1997 | Hu | 303/146 |
| 5,747,683 | * | 5/1998 | Gerum et al. | 701/72 |
| 5,825,284 | * | 10/1998 | Dunwoody et al. | 340/440 |

FOREIGN PATENT DOCUMENTS

| 21 33 547 | 1/1973 | (DE) . |
|---|---|---|
| 36 06 797 | 9/1987 | (DE) . |
| 38 17 546 | 12/1989 | (DE) . |
| 39 19 347 | 12/1993 | (DE) . |
| 0321894A2 | 6/1989 | (EP) . |

* cited by examiner

Primary Examiner—Robert J. Oberleitner
Assistant Examiner—Robert A. Siconolfi
(74) Attorney, Agent, or Firm—Evenson, McKeown, Edwards & Lenahan, P.L.L.C.

(57) ABSTRACT

A method and apparatus is provided for controlling the handling dynamics of a vehicle, in particular a commercial vehicle, fitted with an ABS system. The method requires varying the brake pressure of the vehicle in the event of an impending wheel lock up to prevent excessive wheel slippage. The method and apparatus are configured such that any decrease in the roll-over stability of the vehicle while negotiating a curve is detected with an ABS system.

12 Claims, 2 Drawing Sheets

METHOD AND DEVICE FOR CONTROLLING HANDLING DYNAMICS OF MOTOR VEHICLES

BACKGROUND AND SUMMARY OF THE INVENTION

The invention relates to a method and apparatus for controlling the driving dynamics of a vehicle equipped with an ABS system, where the braking pressure is varied (when the wheels exhibit an impending lockup) in order to prevent excessive wheel slippage.

For early avoidance of critical situations, it is advantageous in many driving situations to intervene in the handling of the vehicle (via a control or control system) depending on parameters of a specific driving situation. A number of products on the market use known embodiments of the present method.

Contrary to the prior art, however, it is an object of the present invention to provide a method for controlling the driving dynamics of a vehicle that also detects in a simple manner borderline situations regarding the tipping stability of motor vehicles.

This and other objects and advantages are achieved by the apparatus according to the invention, in which a method for controlling the driving dynamics of motor vehicles (especially commercial vehicles) is implemented when the brakes exhibit a tendency to lock up to vary the brake pressure in order to avoid excessive wheel slippage (detected by an ABS control system) and a decrease in the stability of the vehicle when negotiating a curve.

In an embodiment of the invention, additional software for the ABS system is provided, so that a decrease in the roll-over stability of the vehicle when negotiating a curve is detected using the ABS system.

The invention is therefore advantageously suitable for avoiding dangerous situations in which a vehicle (especially a commercial vehicle) threatens to tip over. In the specific case of commercial vehicles, with a correspondingly high positive contact between the road and the tires, the vehicle can also tip over instead of rounding the curve. The present invention detects this situation (in a surprisingly simple manner) by using an ABS control procedure during a brake application when negotiating a curve.

In an especially advantageous improvement on the invention, for example, an automatic braking system, if the driver applies the brakes lightly when rounding a curve (so lightly that lockup caused by ice, for example, cannot occur), the lockup of the wheels is used to trigger a warning signal or a stabilizing intervention in the handling dynamics of the vehicle, since lockup of the wheels (in this case) indicates that the vehicle is slightly lifting the corresponding wheels off the ground.

Activation of the ABS system can be detected electronically, for example. Additional expensive sensors are not required; only the transverse acceleration can be detected, for example, via a sensor suited for the purpose. To increase driving stability, when a decrease in tipping stability is detected, control of the handling dynamics can be triggered to increase the roll-over stability of the vehicle. An especially advantageous application of the invention is in the commercial vehicle area, because it is precisely in this case that accidents happen as a result of the vehicle tipping over on curves, or when violent steering movements are made in response to a dangerous situation.

Another critical advantage of the invention is in the case of a combination vehicle composed of a tractor and a trailer. Here, the software and/or hardware for control need only be installed on the tractor. As a result, the invention can then be used on all vehicles that pull trailers equipped with ABS systems (semitrailers for example) without the trailer's ABS system having to be equipped with special additional devices related to handling dynamics. The cost of the trailer's ABS system is unaffected by the invention. In addition, a tractor equipped with a device for implementing the method according to the invention can be combined with a wide variety of trailers regardless of their ABS systems.

It is also especially advantageous if it is initially determined on the basis of a suitable parameter (for example, transverse acceleration) that the vehicle is rounding a curve and thus a dangerous situation has developed. Here, a slight ABS intervention is automatically launched (in an air brake system of a truck, for example, braking at 0.5 bar) which has almost no effect on the handling of the vehicle. Nevertheless, if an ABS control process is launched in such a situation, it is highly probable that the problem is not one due to the wheels locking up because the road is icy, but rather the problem is a lockup caused by a particular wheel lifting off the road. In this case, for example, warning signals are displayed to the driver and/or a brake application is triggered to reduce the transverse acceleration or another suitable intervention is made in the handling dynamics (throttling the engine or steering).

Embodiments of the invention will be described in greater detail below with reference to the drawings.

DETAILED DESCRIPTION OF THE DRAWINGS

Figure 1:
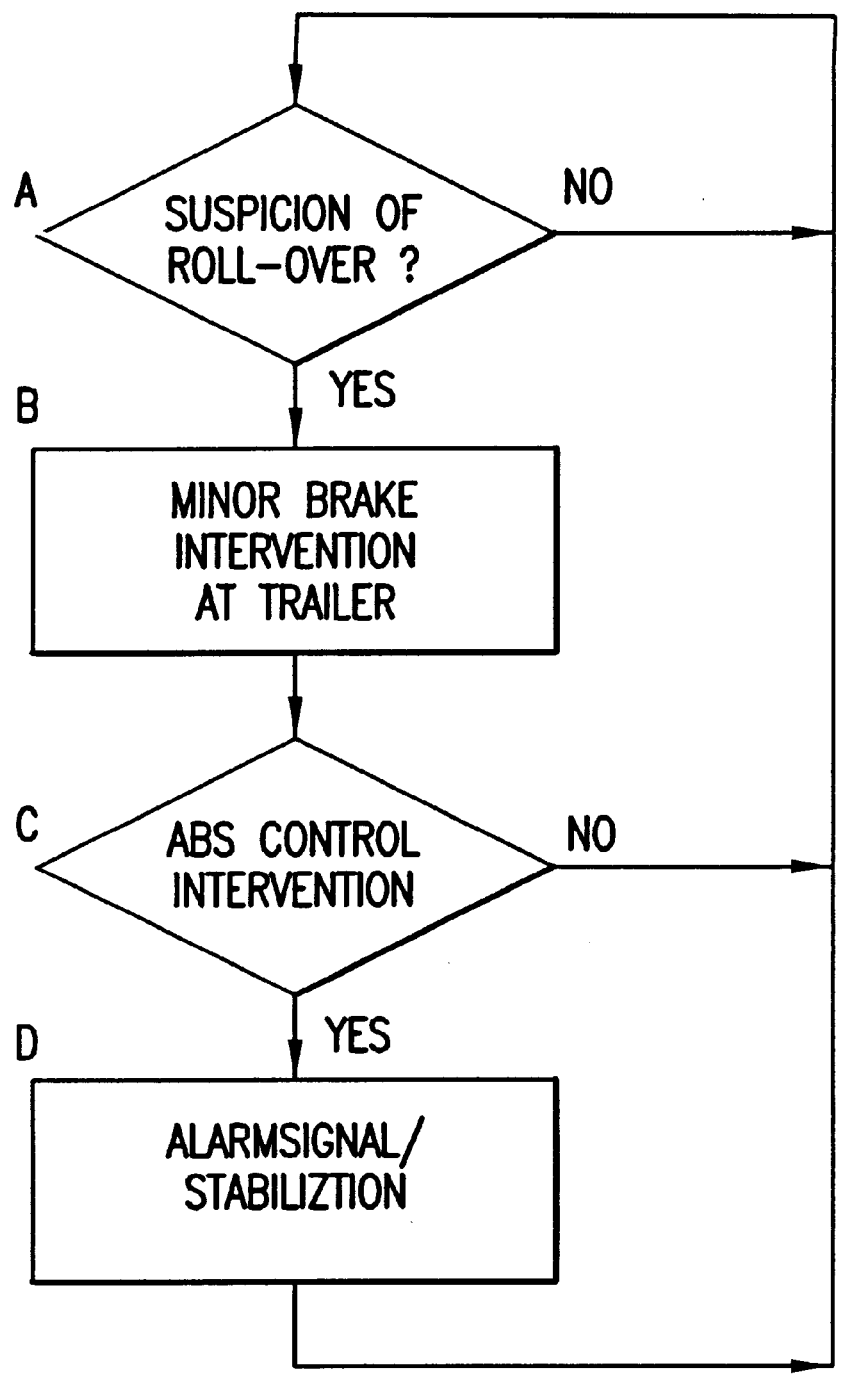
FIG. 1 is a flowchart that shows one embodiment of a control method according to the invention.

FIG. 1 shows a flowchart that illustrates an especially advantageous version of the invention. It shows a method for controlling driving dynamics, with the following steps that proceed in loops:

A) Initially, a constant determination of the transverse acceleration of a vehicle is performed, i.e., is the transverse acceleration exceeding previously detected borderline values?

B) If the transverse acceleration exceeds a borderline value, a braking intervention is initiated that is smaller than the maximum possible braking force. The intervention serves primarily to detect whether the wheels are lifting off the ground (in this case the ABS intervenes even at a low braking force).

C) If the wheels are lifting off the ground, monitoring is performed continuously to detect whether the ABS system (depending on the wheel load) is responding (measurement of power supply at the plug on the tractor or at the ABS valve).

D) If the ABS system responds, an alarm signal is triggered and/or a control intervention is made in the handling characteristics of the vehicle that increases the roll-over stability (a brake application for example, possibly with the ABS deactivated).

In the case of a tractor-trailer unit with a semitrailer, the beginning of ABS regulation intervention in the trailer is used to detect a decrease in the roll-over stability of the vehicle while negotiating a curve.

Figure 2:
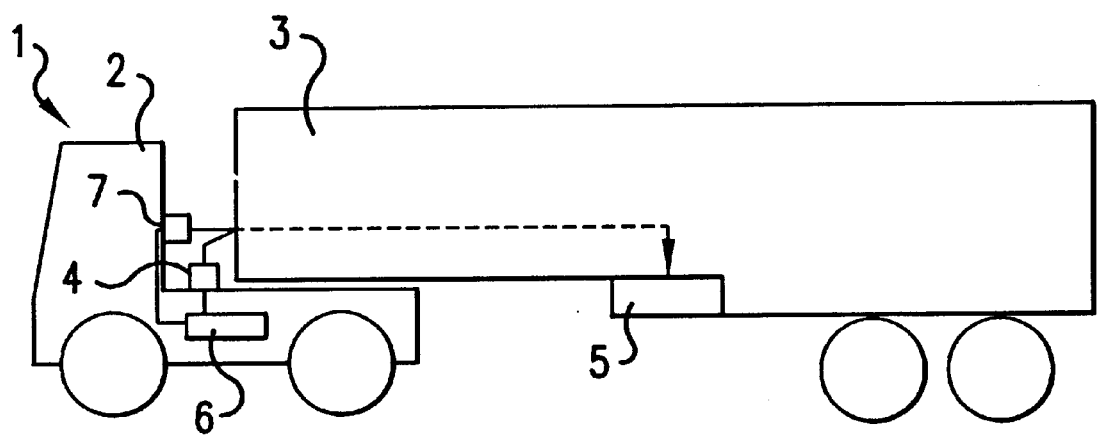
FIG. 2 is a diagram of a tractor-trailer unit equipped with the invention.

FIG. 2 shows a schematic diagram of a commercial vehicle (tractor-trailer unit) equipped with an apparatus according to the invention. Commercial vehicle 1 consists of a tractor 2 and semitrailer 3. Via a measuring device 4 for measuring the current connected to the trailer ABS 5, the initiation of an ABS control intervention can be detected, fed to ABS control unit 6 and supplemented by corresponding software and/or hardware devices to regulate driving dynamics (reference number 7; brake pressure regulator for the semitrailer). Here, it is clear that no design changes are required in semitrailer 3 in order to use the invention.

Figure 3:
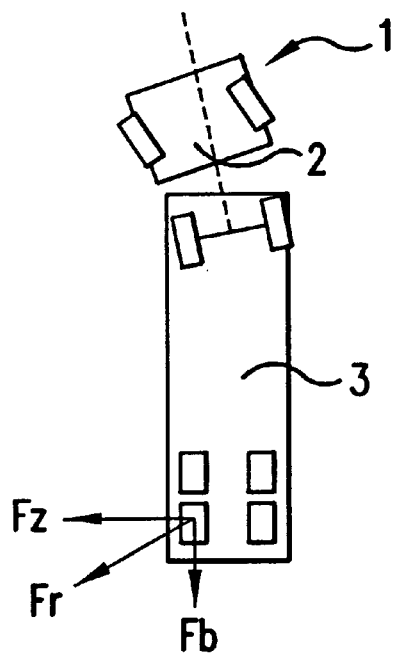
FIG. 3 shows a driving situation illustrating the effect of the invention.

FIG. 3, showing the vehicle shown in FIG. 2 negotiating a curve, demonstrates how the invention works. When a previously detected transverse acceleration is exceeded (more than 4 m/s$^2$, for example), a "slight" brake intervention is performed on the semitrailer ($F_B$). This has a minimal effect on transverse acceleration. If an ABS control intervention begins, a stronger brake application is made to reduce the transverse acceleration, accordingly.

As is readily apparent, braking force ($F_B$) and centrifugal force ($F_Z$) produce a force ($F_R$) that has a stabilizing effect on the tendency of the vehicle to roll over. To stabilize the vehicle, it can even be advantageous to shut off the ABS system (using a relay, for example).

What is claimed is:

1. A method for controlling handling dynamics of a motor vehicle equipped with an ABS system which varies a braking pressure when a wheel shows a tendency to lock up, in order to prevent excessive wheel slip, the method comprising the acts of:

determining a potential situation for a roll over stability problem of the vehicle;

detecting a decrease in roll over stability of the vehicle when negotiating a curve using ABS control intervention;

wherein the detecting act comprises:
   (a) triggering a braking intervention that is small relative to a maximum possible braking force if there is a potential situation for the roll over stability problem;
   (b) monitoring the ABS system; and
   (c) triggering one of an alarm signal or a control intervention if the ABS system responds when the braking intervention is triggered.

2. The method according to claim 1 wherein the vehicle is a commercial vehicle.

3. The method according to claim 1, further comprising the act of triggering a control intervention in the handling dynamics that increases the roll over stability of the vehicle when a decrease in the roll over stability is detected.

4. The method according to claim 1, wherein the determining act further comprises the act of:

determining if a transverse acceleration of the vehicle exceeds a defined limit.

5. The method according to claim 3, wherein the step of triggering a control intervention comprises triggering a further brake intervention.

6. The method according to claim 3, wherein the determining acts further comprise the acts of:

determining a transverse acceleration of the vehicle.

7. The method according to claim 6, wherein the step of triggering a control intervention comprises triggering a brake intervention.

8. The method according to claim 1, wherein the motor vehicle is a tractor-trailer unit having a tractor and a semitrailer, the method further comprises the act of:

only using the beginning of an ABS control intervention in the trailer to detect a decrease in the roll-over stability of the vehicle while negotiating a curve.

9. The method according to claim 4, wherein the control intervention that increases the roll-over stability of the vehicle is a brake application with the ABS deactivated.

10. An apparatus for controlling the handling dynamics of a motor vehicle equipped with an ABS system, in which the braking pressure can be varied when the wheels exhibit a tendency to lock up, in order to prevent excessive wheel slip, comprising:

means for determining a potential situation for a roll-over stability problem of the vehicle; and means for detecting a decrease in the roll over stability of the vehicle as it negotiates a curve by monitoring an ABS system in the potential situation while triggering a braking intervention that is small relative to the maximum possible braking force.

11. The apparatus according to claim 10, wherein the vehicle is a commercial vehicle.

12. The apparatus according to claim 10, wherein said means for detecting comprises a software program stored on a memory of an ABS control unit of the ABS system.

* * * * *